(12) United States Patent
Barrus et al.

(10) Patent No.: US 9,086,798 B2
(45) Date of Patent: Jul. 21, 2015

(54) ASSOCIATING INFORMATION ON A WHITEBOARD WITH A USER

(75) Inventors: John Barrus, Menlo Park, CA (US); Vikas Krishna, San Jose, CA (US); Jonathan J. Hull, San Carlos, CA (US)

(73) Assignee: Ricoh Company, Ltd., Tokyo (JP)

( * ) Notice: Subject to any disclaimer, the term of this patent is extended or adjusted under 35 U.S.C. 154(b) by 34 days.

(21) Appl. No.: 13/041,910

(22) Filed: Mar. 7, 2011

(65) Prior Publication Data

US 2012/0229425 A1 Sep. 13, 2012

(51) Int. Cl.
*G06F 3/0488* (2013.01)
*G06F 21/32* (2013.01)
*G06K 9/00* (2006.01)

(52) U.S. Cl.
CPC ............ *G06F 3/04883* (2013.01); *G06F 21/32* (2013.01); *G06K 9/00416* (2013.01); *G06K 2209/27* (2013.01)

(58) Field of Classification Search
CPC ..... G06F 3/041; G06F 3/033; G06F 3/03545; G06F 3/04883; G06F 21/32; G06K 9/0046; G06K 2209/27
USPC ......................................................... 345/179
See application file for complete search history.

(56) References Cited

U.S. PATENT DOCUMENTS

| | | | |
|---|---|---|---|
| 5,025,314 A | 6/1991 | Tang et al. | |
| 5,400,069 A | 3/1995 | Braun et al. | |
| 5,570,301 A | 10/1996 | Barrus | |
| 5,767,897 A | 6/1998 | Howell | |
| 5,790,114 A * | 8/1998 | Geaghan et al. | 715/763 |
| 5,844,569 A | 12/1998 | Eisler et al. | |
| 6,070,247 A | 5/2000 | Wallace et al. | |
| 6,707,444 B1 | 3/2004 | Hendriks et al. | |
| 6,772,335 B2 | 8/2004 | Curtis et al. | |
| 6,917,033 B2 | 7/2005 | Hendriks et al. | |
| 6,963,334 B1 | 11/2005 | Stevens et al. | |
| 6,985,620 B2 | 1/2006 | Sawhney et al. | |
| 7,170,526 B1 | 1/2007 | Johnson | |
| 7,219,233 B1 * | 5/2007 | Hendriks et al. | 713/182 |
| 7,242,389 B1 | 7/2007 | Stern | |
| 7,355,584 B2 | 4/2008 | Hendriks et al. | |
| 7,554,576 B2 | 6/2009 | Erol et al. | |
| 7,634,540 B2 | 12/2009 | Ivashin et al. | |

(Continued)

FOREIGN PATENT DOCUMENTS

| | | | |
|---|---|---|---|
| CN | 1473292 A | 4/2004 | |
| CN | 1617129 A | 5/2005 | |

(Continued)

OTHER PUBLICATIONS

U.S. Appl. No. 13/041,769, filed Mar. 7, 2011 by John Barrus.

(Continued)

*Primary Examiner* — Towfiq Elahi
(74) *Attorney, Agent, or Firm* — Kilpatrick Townsend & Stockton LLP

(57) ABSTRACT

Techniques for associating strokes information generated at an interactive whiteboard system with a user identifier. The user identifier may, for example, be an image of a user who generated the strokes information. The associating may be performed based upon time stamps associated with the strokes information and the image. Information may be stored indicative of the association between the strokes information and the user identifier.

20 Claims, 10 Drawing Sheets

| Image ID | Stroke ID | Additional Information | | |
|---|---|---|---|---|
| | | Name | Contact | Location |
| Image_001 | 1 | John Doe | Jdoe@xyz.com | California |
| Image_002 | 22 | Jane.Smith | Jsmith@xyz.com | Florida |
| ⋮ | ⋮ | ⋮ | ⋮ | ⋮ |
| Image_N | N | Sally Mae | +81 3 396725 | Japan |

(56) References Cited

U.S. PATENT DOCUMENTS

| | | | |
|---|---|---|---|
| 7,791,597 B2* | 9/2010 | Silverstein et al. | 345/179 |
| 8,125,510 B2 | 2/2012 | Agarwal et al. | |
| 8,180,567 B2 | 5/2012 | Geelen et al. | |
| 8,195,952 B2 | 6/2012 | Andreev et al. | |
| 8,234,578 B2 | 7/2012 | Ferren et al. | |
| 8,352,180 B2 | 1/2013 | Geelen et al. | |
| 8,355,038 B2 | 1/2013 | Robinson et al. | |
| 8,390,718 B2 | 3/2013 | Robinson et al. | |
| 8,698,873 B2 | 4/2014 | Barrus | |
| 8,881,231 B2 | 11/2014 | Barrus | |
| 2001/0051876 A1 | 12/2001 | Seigel et al. | |
| 2002/0135536 A1 | 9/2002 | Bruning | |
| 2002/0196327 A1 | 12/2002 | Riu et al. | |
| 2003/0058227 A1 | 3/2003 | Hara et al. | |
| 2003/0065722 A1 | 4/2003 | Ieperen | |
| 2003/0070072 A1 | 4/2003 | Nassiri | |
| 2003/0078840 A1 | 4/2003 | Strunk et al. | |
| 2003/0138135 A1* | 7/2003 | Chung et al. | 382/119 |
| 2003/0236792 A1 | 12/2003 | Mangerie et al. | |
| 2004/0070616 A1 | 4/2004 | Hildebrandt et al. | |
| 2004/0199639 A1 | 10/2004 | Harris | |
| 2005/0093948 A1 | 5/2005 | Morris et al. | |
| 2005/0104864 A1 | 5/2005 | Zhang et al. | |
| 2006/0053230 A1 | 3/2006 | Montero | |
| 2006/0092178 A1 | 5/2006 | Tanguay, Jr. et al. | |
| 2006/0285689 A1* | 12/2006 | Selve | 380/229 |
| 2007/0216660 A1 | 9/2007 | Sposato et al. | |
| 2007/0245407 A1 | 10/2007 | Lester et al. | |
| 2008/0043100 A1* | 2/2008 | Sobel et al. | 348/139 |
| 2008/0089586 A1 | 4/2008 | Igarashi et al. | |
| 2008/0316348 A1 | 12/2008 | Hallock | |
| 2009/0002346 A1 | 1/2009 | Henning et al. | |
| 2009/0019360 A1 | 1/2009 | Lynggaard et al. | |
| 2009/0021495 A1 | 1/2009 | Edgecomb et al. | |
| 2009/0063492 A1 | 3/2009 | Meyyappan et al. | |
| 2009/0073129 A1 | 3/2009 | Sirotich et al. | |
| 2009/0116703 A1* | 5/2009 | Schultz | 382/118 |
| 2009/0146973 A1 | 6/2009 | Ung et al. | |
| 2009/0160818 A1 | 6/2009 | Wilde et al. | |
| 2009/0173856 A1 | 7/2009 | Auger et al. | |
| 2009/0173867 A1 | 7/2009 | Auger et al. | |
| 2009/0183228 A1 | 7/2009 | Dasch et al. | |
| 2009/0244278 A1 | 10/2009 | Taneja et al. | |
| 2009/0271848 A1 | 10/2009 | Leung et al. | |
| 2009/0309956 A1 | 12/2009 | Hawkins et al. | |
| 2009/0315861 A1 | 12/2009 | Zhang et al. | |
| 2010/0037273 A1 | 2/2010 | Dressel et al. | |
| 2010/0049626 A1 | 2/2010 | Hong et al. | |
| 2010/0073330 A1 | 3/2010 | Ericson et al. | |
| 2010/0149349 A1 | 6/2010 | Kroeker et al. | |
| 2010/0153160 A1 | 6/2010 | Bezemer et al. | |
| 2010/0178645 A1 | 7/2010 | Ieperen et al. | |
| 2010/0182285 A1 | 7/2010 | Tremblay | |
| 2010/0188478 A1 | 7/2010 | Robinson et al. | |
| 2010/0194708 A1 | 8/2010 | Popovich | |
| 2010/0231556 A1 | 9/2010 | Mines et al. | |
| 2010/0281287 A1 | 11/2010 | Doerksen et al. | |
| 2010/0289776 A1 | 11/2010 | Bryborn Krus et al. | |
| 2010/0293601 A1* | 11/2010 | Schultz et al. | 726/4 |
| 2010/0293605 A1 | 11/2010 | Longobardi | |
| 2010/0315413 A1 | 12/2010 | Izadi et al. | |
| 2010/0315994 A1 | 12/2010 | Lam | |
| 2011/0013001 A1 | 1/2011 | Craven-Bartle et al. | |
| 2011/0084893 A1 | 4/2011 | Lee et al. | |
| 2011/0109554 A1 | 5/2011 | Boissier | |
| 2011/0181520 A1 | 7/2011 | Boda et al. | |
| 2011/0234746 A1 | 9/2011 | Saleh et al. | |
| 2011/0320961 A1 | 12/2011 | Sriraghavan et al. | |
| 2012/0030756 A1 | 2/2012 | Todd | |
| 2012/0110007 A1 | 5/2012 | Cohen et al. | |
| 2012/0117514 A1 | 5/2012 | Kim et al. | |
| 2012/0218304 A1 | 8/2012 | Anzures et al. | |
| 2012/0229589 A1 | 9/2012 | Barrus | |
| 2012/0229590 A1 | 9/2012 | Barrus | |
| 2012/0233553 A1 | 9/2012 | Barrus | |
| 2012/0233615 A1 | 9/2012 | Barrus | |
| 2012/0274584 A1 | 11/2012 | Schweikart | |
| 2012/0278388 A1 | 11/2012 | Kleinbart et al. | |
| 2012/0280948 A1 | 11/2012 | Barrus et al. | |
| 2012/0281092 A1 | 11/2012 | Olivier et al. | |

FOREIGN PATENT DOCUMENTS

| | | |
|---|---|---|
| CN | 101436136 A | 3/2009 |
| CN | 101819511 A | 1/2010 |
| CN | 101657826 A | 2/2010 |
| EP | 1 613 084 A2 | 1/2006 |
| JP | H06-243076 A | 9/1994 |
| JP | 2000-043486 A | 2/2000 |
| JP | 2007-158601 A | 6/2007 |
| JP | 2008-257660 A | 10/2008 |
| JP | 2009-151508 A | 7/2009 |
| JP | 2012-507052 A | 3/2012 |
| WO | WO 94/07327 A1 | 3/1994 |
| WO | WO 01/10121 A1 | 2/2001 |
| WO | WO 2006/071637 A2 | 7/2006 |
| WO | 2010/053803 A1 | 5/2010 |
| WO | 2010/100157 A1 | 9/2010 |

OTHER PUBLICATIONS

U.S. Appl. No. 13/041,792, filed Mar. 7, 2011 by John Barrus.
U.S. Appl. No. 13/041,805, filed Mar. 7, 2011 by John Barrus.
U.S. Appl. No. 13/041,838, filed Mar. 7, 2011 by John Barrus.
U.S. Appl. No. 13/102,963, filed May 6, 2011 by John Barrus et al.
"Hitachi to Bundle EverNote Software and Technologies With StarBoard Products", Ritescript Press Releases, Nov. 7, 2007, Evernote Corp., 2 pages.
Baker at el., "Computation and Performance Issues in Coliseum, an Immersive Videoconferencing System", Jul. 15, 2003, Mobile and Media Systems Laboratory, HP Laboratories, Palo Alto, USA, 18 pages.
Bezaitis, "New Technologies for Aging in Place", Aging Well, vol. 1 No. 2 p. 26, Spring 2008, Great Valley Publishing Co., Inc., Spring City, USA, 4 pages.
Cisco WebEx Meeting Center—Product Overview: Share ideas with anyone, anywhere—online, Copyright 2011, Cisco Systems, Inc., 2 pages.
Citrix Online, Product Overview|Web Conferencing, Collaboration Tools, Copyright 2011, Citrix Online, 4 pages.
CopyCam Installation and Operation Guide, Copyright 2009, Steelcase Corporation, 72 pages.
Dibbell, "Gestural Interfaces", Technology Review, May/Jun. 2011, MIT, 1 page.
Hitachi Digital Media, "Ultimate Short Throw LCD Projectors for Business and Education, Preliminary Specifications", Sep. 2010, downloaded from internet http://www.hitachiultimateprojector.com/docs/Ultimate_Short_Throw_Brochure_UK_prelim.pdf, 4 pages.
How Aviary Uses Evernote for WhiteBoard Sessions, Aviary.com, downloaded from internet http://www.youtube.com/watch?v=tmtHJ7lJPrc on Apr. 2, 2012, 6 pages.
Ishii et al., "ClearBoard: A Seamless Medium for Shared Drawing and Conversation with Eye Contact", CHI '92, May 3-7, 1992, Association for Computing Machinery, 10 pages.
Ishii et al., "Iterative Design of Seamless Collaboration Media", vol. 37 No. 8, Aug. 1994, Communications of the ACM, Association for Computing Machinery, pp. 84-97, 15 pages.
Kunz et al., "ColloBoard: A Novel Interactive Electronic Whiteboard for Remote Collaboration with People on Content", 2010 International Conference on Cyberworlds, Copyright 2010 IEEE Computer Society, 8 pages.
Larkin, "Editorial Review of BumpTop", PCWorld.com, downloaded from internet http://www.pcworld.com/downloads/file/fid,77603/description.html on Sep. 15, 2011, 1 page.
Liao et al., "Robust and Accurate Visual Echo Cancelation in a Full-duplex Projector-camera System", Sep. 9, 2006, 17 pages.
LifeSize Desktop—Superior Standalone HD Desktop Client, Copyright 2010, LifeSize Communications, 2 pages.

(56) References Cited

OTHER PUBLICATIONS

Microsoft® Office Live Meeting Feature Guide, Jan. 2005, Microsoft Corporation, 17 pages.
MimioCapture Ink Recording System, Copyright 2011 DYMO Mimio, downloaded from internet http://www.mimio.dymo.com/en-US/Products/MimioCapture.aspx on Sep. 15, 2011, 1 page.
MimioClassroom Solution, Copyright 2011 DYMO Mimio, downloaded from internet http://www.mimio.dymo.com/en-US/Products/MimioClassroom-Family-of-Products.aspx on Sep. 15, 2011, 2 pages.
MimioPad Wireless Tablet, Copyright 2011 DYMO Mimio, downloaded from internet http://www.mimio.dymo.com/en-US/Products/MimioPad-Wireless-Tablet.aspx on Sep. 15, 2011, 1 page.
MimioStudio 9 Software, Jan. 2012 Specifications Sheet, DYMO, 2 pages.
MimioStudio Interactive Software, Copyright 2011 DYMO Mimio, downloaded from internet http://www.mimio.dymo.com/en-US/Products/MimioStudio-Software.aspx on Sep. 15, 2011, 1 page.
MimioTeach Interactive System, Copyright 2011 DYMO Mimio, downloaded from internet http://www.mimio.dymo.com/en-US/Products/MimioTeach-Interactive-System.aspx on Sep. 15, 2011, 2 pages.
MimioTeach, Jan. 2012 Specifications Sheet, DYMO, 2 pages.
MimioView Document Camera, Copyright 2011 DYMO Mimio, downloaded from internet http://www.mimio.dymo.com/en-US/Products/MimioView-Document-Camera.aspx on Sep. 15, 2011, 1 page.
Mohan et al., "Bokode: Imperceptible Visual tags for Camera Based Interaction from a Distance", Camera Culture Group, MIT Media Lab, downloaded from internet http://cameraculture.media.mit.edu/bokode on Sep. 15, 2011, 12 pages.
Raskar et al., "The Office of the Future: A Unified Approach to Image-Based Modeling and Spatially Immersive Displays", Jul. 19-24, 1998, SIGGRAPH 98, Orlando, Florida, Computer Graphics Proceedings, Annual Conference Series, 10 pages.
Screen sharing, Skype, downloaded from internet http://www.skype.com/intl/en-us/features/allfeatures/screen-sharing/ on Jan. 18, 2012, 4 pages.
Scriblink, Copyright 2012 Scriblink LLC., downloaded from internet http://www.scriblink.com/index.jsp?act=about on Feb. 7, 2012, 1 page.
SMART Bridgit™ conferencing software, Copyright 2011, SMART Technologies, 2 pages.
Smart Notebook™ 10.8—Mac OS X operating system software User's guide, Copyright 2008-2011, SMART Technologies ULC., 134 pages.
Tan et al., "ConnectBoard: A remote collaboration system that supports gaze-aware interaction and sharing", MMSP 2009: IEEE International Workshop on Multimedia Signal Processing, Oct. 5-7, 2009, Rio de Janeiro, Brazil, Abstract downloaded from internet ieeexplore.ieee.org/xpl/freeabs_all.jsp?arnumber=5293268 on Feb. 7, 2012, 1 page.
Tan et al., "ConnectBoard: Enabling Genuine Eye Contact and Accurate Gaze in Remote Collaboration", IEEE Transactions on Multimedia, vol. 13, No. 3, Jun. 2011, pp. 466-473, 9 pages.
Tan et al., "Enabling Genuine Eye Contact and Accurate Case in Remote Collaboration", Presented at IEEE International Conference on Multimedia and Expo, Jul. 19, 2010, Mobile and Media Systems Laboratory, HP Laboratories, Palo Alto, USA, pp. 430-435, 7 pages.
Tang et al., "VideoArms: Embodiments for Mixed Presence Groupware", Sep. 11-15, 2006, Copyright 2006 ACM, London, UK, 16 pages.
VNC Enterprise Edition—Product Information: Overview, Copyright 2011, RealVNC Limited, 2 pages.
Wacom Components: Input Technology, Copyright 2007 Wacom, downloaded from internet http://www.wacom-components.com/english/technology/index.html on Sep. 15, 2011, 2 pages.
Wacom Components: Input Technology: EMR Technology, Copyright 2007 downloaded from internet http://www.wacom-components.com/english/technology/emr.html on Sep. 15, 2011, 4 pages.
Wacom Components: Input Technology: Features and Advantages of EMR Technology, Copyright 2007 Wacom, downloaded from internet http://www.wacom-components.com/english/technology/feature.html on Sep. 15, 2011, 2 pages.
Wacom Components: Input Technology: Mobile Equipment, Copyright 2007 Wacom, downloaded from internet http://www.wacom-components.com/english/technology/mobile.html on Sep. 15, 2011, 3 pages.
Wacom Components: Input Technology: Penabled Technology, Copyright 2007 Wacom, downloaded from internet http://www.wacom-components.com/english/technology/penabled.html on Sep. 15, 2011, 1 page.
Wacom Components: Input Technology: Touch Technology, Copyright 2007 Wacom, downloaded from internet http://www.wacom-components.com/english/technology/touch.html on Sep. 15, 2011, 3 pages.
Wilson et al., "Combining Multiple Depth Cameras and Projectors for Interactions on, Above, and Between Surfaces", Oct. 3-6, 2010, UIST '10, ACM, New York, USA, 10 pages.
Non-Final Office Action for U.S. Appl. No. 13/041,769 mailed Aug. 31, 2012, 23 pages.
Final Office Action for U.S. Appl. No. 13/041,792 mailed on Oct. 17, 2012, 18 pages.
Non-Final Office Action for U.S. Appl. No. 13/041,805 mailed on Oct. 30, 2012, 8 pages.
Katz, "Chemistry in the Toy Store™", 6th Edition, Updated 2002, 13 pages.
Lee, Low-Cost Multi-Point Interactive Whiteboard using the Wiimote, downloaded from internet http://www.youtube.com/watch?v=5s5EvhHy7eQ on Apr. 26, 2012, 2 pages.
Faces in Real-Life Images, downloaded from internet http://people.cs.umass.edu/~elm/realfaces/call.html on Apr. 26, 2012, 2 pages.
Face Recognition Homepage downloaded from internet http://www.face-rec.org/conferences/ on Apr. 26, 2012, 7 pages.
Sticky-Notes.net, downloaded from internet http://www.sticky-notes.net on Apr. 26, 2012, 3 pages.
Mistry, "Quickies, Intelligent Sticky Notes", MIT Media Lab, downloaded from internet http://pranavmistry.com/projects/quickies/ on Apr. 26, 2012, 4 pages.
Quickies: Sticky Notes of 21st Century, downloaded from internet http://www.youtube.com/watch?v=HQT5_4aVvHU on Apr. 26, 2012, 3 pages.
Post-It Digital Notes, downloaded from internet http://download.cnet.com?Post-it-Digital-Notes/3000-2351_4-10060027.html on Apr. 26, 2012, 7 pages.
Non-Final Office Action for U.S. Appl. No. 13/041,792 mailed Jun. 7, 2012, 17 pages.
Non-Final Office Action for U.S. Appl. No. 13/041,792 mailed on Dec. 5, 2013, 21 pages.
Notice of Allowance for U.S. Appl. No. 13/041,769 mailed on Dec. 11, 2013, 11 pages.
Notice of Allowance for U.S. Appl. No. 13/041,838 mailed on Dec. 18, 2013, 9 pages.
Non-Final Office Action for U.S. Appl. No. 13/102,963 mailed on Jan. 22, 2013, 8 pages.
Final Office Action for U.S. Appl. No. 13/102,963 mailed on Aug. 22, 2013, 10 pages.
Non-Final Office Action for U.S. Appl. No. 13/041,838 mailed on Sep. 5, 2013, 6 pages.
Office Action in related Japanese Application No. 2012-047976 dated Apr. 15, 2014, 3 pages. (no translation available).
Non-Final Office Action for U.S. Appl. No. 13/041,805 mailed on Feb. 21, 2014, 5 pages.
Notice of Allowance for U.S. Appl. No. 13/041,769 mailed on Apr. 21, 2014, 7 pages.
English translation and Notification of the First Office Action for corresponding Chinese Patent Application No. 201210055091X dated Jan. 15, 2014, 16 pages.
English translation and Notification of the First Office Action for corresponding Chinese Patent Application No. 2012100569418 dated Jun. 17, 2014, 22 pages.
Notice of Allowance for U.S. Appl. No. 13/041,805 mailed on Jun. 11, 2014, 7 pages.

(56) References Cited

OTHER PUBLICATIONS

Office Action in related Japanese Application No. 2012-047976 dated Nov. 19, 2013, 3 pages.
Advisory Action for U.S. Appl. No. 13/041,769 mailed on May 28, 2013, 4 pages.
Advisory Action for U.S. Appl. No. 13/102,963 mailed on Jan. 14, 2014, 3 pages.
Extended European Search Report for corresponding European Application No. 12156239.1 dated Apr. 15, 2014, 7 pages.
Final Office Action for U.S. Appl. No. 13/041,792 mailed on May 14, 2014, 25 pages.
Non-Final Office Action for U.S. Appl. No. 13/041,805 mailed on Jan. 7, 2015, 12 pages.
Office Action in related Japanese Patent Application No. 2013-194546 dated Sep. 2, 2014, 2 pages. (no translation available).
Notice of Allowance for U.S. Appl. No. 13/041,769 mailed on Sep. 12, 2014, 2 pages.
Apperley et al., "Use of Video Shadow for Small Group Interaction Awareness on a Large Interactive Display Surface", The Computer Science Department University of Waikato, Hamilton, New Zealand, 2002, 10 pages.
Extended European Search Report for European Application No. 12156226.8 dated May 9, 2012, 5 pages.
Final Office Action for U.S. Appl. No. 13/041,805 mailed on Mar. 1, 2013, 10 pages.
Final Office Action for U.S. Appl. No. 13/041,769 mailed on Mar. 5, 2013, 23 pages.
English Translation and Second Office Action for corresponding Japanese Patent Application No. 2012101355153 dated Feb. 13, 2015, 32 pages.
Notice of Allowance for U.S. Appl. No. 13/041,792 mailed on Jan. 28, 2015, 17 pages.
Non-Final Office Action for U.S. Appl. No. 13/102,963 mailed on Mar. 27, 2015, 9 pages.

\* cited by examiner

| STROKE ID | IMAGE ID |
|---|---|
| 1 | IMAGE_001 |
| 34 | IMAGE_002 |
| ⋮ | ⋮ |
| N | IMAGE_N |

*FIG. 2A*

| IMAGE ID | STROKE ID |
|---|---|
| IMAGE_001 | 1, 3, . . . |
| IMAGE_002 | 34, 35, . . . |
| ⋮ | ⋮ |
| IMAGE_N | N, N-1, N-6 . . . |

| IMAGE ID | STROKE ID | ADDITIONAL INFORMATION | | |
|---|---|---|---|---|
| | | NAME | CONTACT | LOCATION |
| IMAGE_001 | 1 | JOHN DOE | JDOE@XYZ.COM | CALIFORNIA |
| IMAGE_002 | 22 | JANE.SMITH | JSMITH@XYZ.COM | FLORIDA |
| ⋮ | ⋮ | ⋮ | ⋮ | ⋮ |
| IMAGE_N | N | SALLY MAE | +81 3 396725 | JAPAN |

| SESSION ID | STROKE ID | IMAGE ID |
|---|---|---|
| VK_001 | 1, 24, 36... | IMAGE_01 |
| VK_001 | 5, 15, 88... | IMAGE_02 |
| JH_012 | 2, 6, 91... | IMAGE_12 |

*FIG. 5*

ASSOCIATING INFORMATION ON A WHITEBOARD WITH A USER

BACKGROUND

Embodiments of the present invention relate to interactive whiteboard systems that can be used collaboratively, and more particularly to techniques for associating information on a whiteboard to the user who generated the information.

An Interactive Whiteboard (IWB) system (also referred to as an electronic whiteboard system) offers several advantages over traditional chalk and board systems. In an IWB system, a user's writings are converted to digital information (also referred to as digital representation of the writing), which may be then projected and displayed on a display surface (like a whiteboard) of the IWB system. In traditional chalk and board systems there is no way of determining which of the participants contributed to the information presented on the chalk board. Also, there may be no way of capturing the information being presented on the chalk board in real-time. Often multiple users may write on the chalk board during a meeting. Unless there is a scribe in the meeting who records everything that each user writes along with the necessary annotations, there may be no way of knowing who contributed to which information once the meeting has concluded.

SUMMARY

The present disclosure is related to whiteboard systems in general. More specifically, embodiments of the present invention provide techniques for associating a user with strokes information captured from a whiteboard system.

Some embodiments of the present invention present a technique where a system receives a user identifier corresponding to a user. The user identifier has a first timing information associated with it. The system also receives information about a stroke generated on a whiteboard. The stroke also has an associated second timing information. Thereafter the controller compares the first timing information and the second timing information and generates information associating the user identifier with the stroke based at least in part on the comparison. The system then stores the association information.

In one embodiment, the system determines whether a value of the first timing information matches a value of the second timing information within a specified margin of error as part of the comparison process.

In one embodiment, the user identifier includes a still image of the user. In another embodiment, the user identifier includes a video of the user.

In one embodiment, the technique further includes the system receiving audio information having a third timing information. The system then compares the third timing information with the first and the second timing information to determine correlation between the audio information, the stroke, and the image.

Certain embodiments of the present invention provide a method performed by a system. The method includes receiving strokes information about a set of strokes. The strokes information have an associated first timing information indicating when the set of strokes were generated. The system also receives a user identifier with associated second timing information. The system then determines that a user associated with the user identifier generated the set of strokes by comparing the first timing information with the second timing information. Thereafter, the system determines identity of the user based at least in part on the user identifier and generates digital information using the strokes information. The system then selects a handwriting sample for the user and using the handwriting sample to analyze the digital information.

In one embodiment, generating digital information comprises applying a curve fitting technique to the strokes information. In another embodiment, the system determines whether the user generated the set of strokes based at least in part on the handwriting analysis.

In some embodiments, the user identifier comprises an image of the user. In other embodiments, determining the identity of the user comprises determining one or more attributes of the user from the image and comparing the one or more attributes to the information stored in a database to determine a match, wherein the one or more attributes comprise a face, height, gait, gestures, or biometric information of the user.

In some embodiments, the system determines additional information about the person based at least in part on the user identifier. In one embodiment, the additional information comprises name of the person, contact information of the person, or location of the person.

In some embodiments, the system receives audio data with an associated third timing information; and generates association information between the audio data and the set of strokes based at least in part on the third timing information and the first timing information.

Some embodiments of the present invention provide a method performed by a system. The method includes receiving information indicating that one or more users are logged into a whiteboard system and receiving information about a set of strokes generated on a writing surface of the whiteboard system. The method further includes determining a set of handwriting samples associated with the one or more users and performing handwriting analysis on the set of strokes using the set of handwriting samples. Thereafter the method includes identifying user information related to a user, from the one or more users, who generated the set of strokes based at least in part on the handwriting analysis and associating the user information with the set of strokes.

In some embodiments, the method further comprises associating an image of the user with the set of strokes. In one embodiment, the method includes searching a database to determine the identity of the user based at least in part on the image and obtaining additional information about the user. The method then includes associating the additional information about the user with the set of strokes.

In one embodiment, the method includes determining one or more attributes of the user based on the image and comparing the one or more attributes to the information stored in the database. In one embodiment, the one or more attributes comprise a face, height, gait, a gesture, or biometric information of the user.

In some embodiments, the method also includes receiving audio information, determining whether the audio information corresponds to the set of strokes, and associating the audio information with the set of strokes based on the determination.

The following detailed description, together with the accompanying drawings will provide a better understanding of the nature and advantages of the embodiments of the present invention.

BRIEF DESCRIPTION OF THE DRAWINGS

FIG. 2A illustrates a table storing correlation information according to an embodiment of the present invention;

FIG. 2B illustrates a table storing correlation information according to another embodiment of the present invention;

FIG. 4 illustrates a table storing correlation information according to yet another embodiment of the present invention;

FIG. 5 illustrates a table storing correlation information according to still another embodiment of the present invention;

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention provide techniques for associating user identifiers to information on a whiteboard. Examples of user identifiers include but are not limited to an image of the user, video of the user, or audio of the user. In one embodiment, an imaging device, e.g., a camera, associated with a interactive whiteboard system captures an image of the person writing on the whiteboard. Concurrently, a writing capture system captures stroke information generated by the user. Both the stroke information and the image are then communicated to a controller, which associates the stroke information with the received image, e.g., based on time stamp information for the image and strokes, and stores that information in a database.

As used herein, a "stroke" comprises data generated by a writing instrument, e.g., a pen, a marker, a light pen, etc. from the time the writing instrument first contacts a writing surface until the contact is interrupted. Each stroke has an associated time component indicative of when the stroke was made. In some embodiments, a stroke may include one or more writing elements. A writing element is the smallest indivisible unit which can be used in stroke analysis. In some embodiments, the entire stroke may be a writing element.

Figure 1:
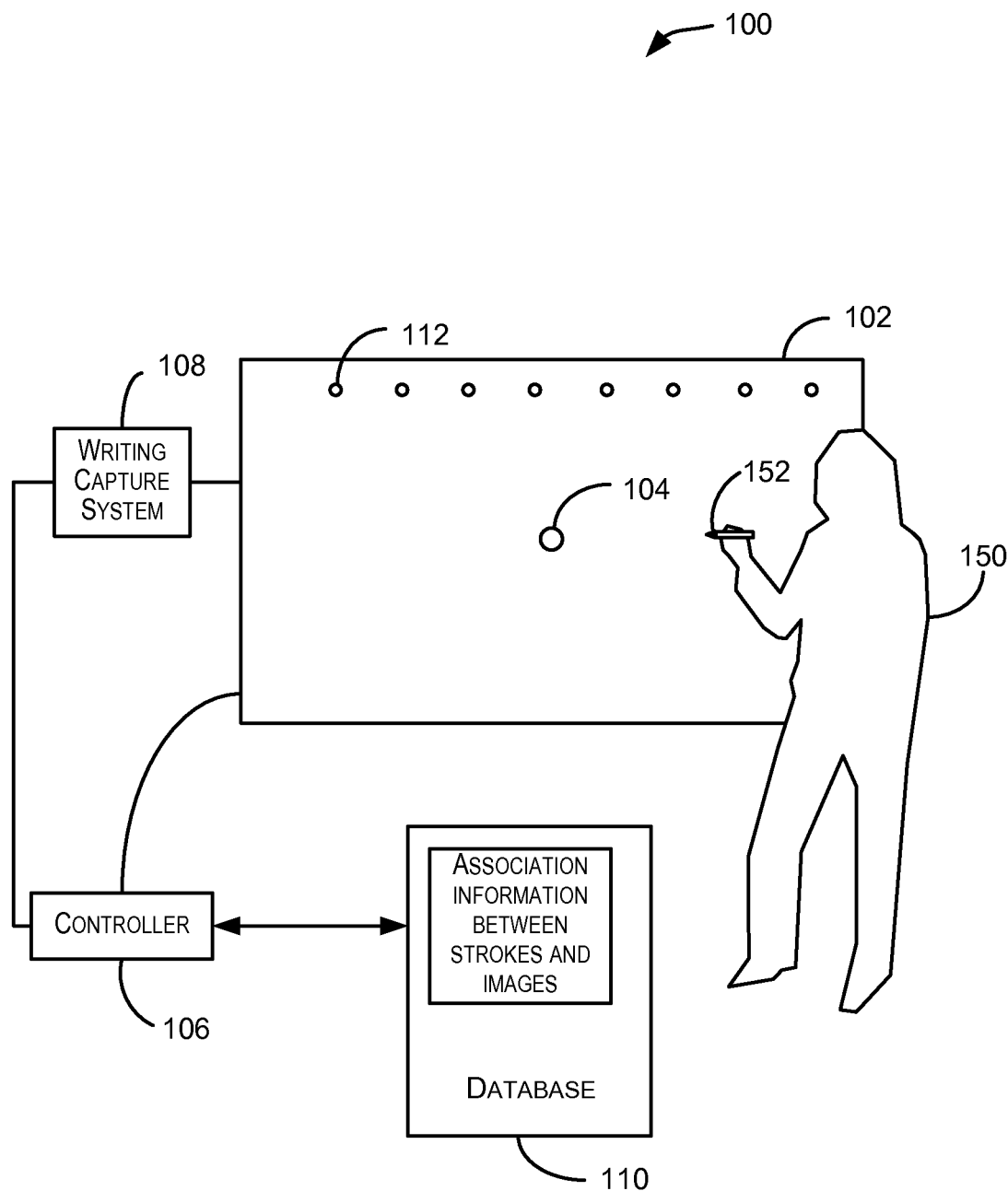
FIG. 1 is a simplified block diagram of an Interactive Whiteboard (IWB) system that may incorporate an embodiment of the present invention.

FIG. 1 is a simplified block diagram of an Interactive Whiteboard (IWB) system 100 that may incorporate an embodiment of the present invention. IWB system 100 may comprise several components including a writing and display surface 102 (hereinafter referred to as "writing surface" or simply "surface"), an image capture device 104, a controller 106, a writing capture system 108, a database 110, and one or more audio capture devices 112. The components of system 100 depicted in FIG. 1 are meant for illustrative purposes only and are not intended to limit the scope of invention embodiments in any manner. Alternative embodiments may have more or fewer components than those shown in FIG. 1.

Display surface 102 (also sometimes referred to as the "whiteboard" or "drawing surface" of the IWB system) provides both an input and an output interface for users of IWB system 100. As an input interface, it enables a user to provide input, which is then converted to digital information. As an output interface, the digital information may be projected on surface 102 by a projector (not shown) such that the projected information can be viewed by one or more users of IWB system 100. One or more users of IWB system 100 may provide input to IWB system 100 by writing using one or more writing instruments. For example, as shown in FIG. 1, a user 150 may be writing on surface 102 using writing instrument 152. The term writing or drawing, as used in this application, may include one or more characters, letters, symbols, words, sentences, tables, drawings, sketches, figures, or any other type of input that can be provided using writing instrument 152. As another example, a writing or drawing can include hand-written letters, numbers, or symbols, expressed in any language or format. As yet another example, a writing or drawing can comprise a combination of hand-drawn pictorial and textual elements. The strokes information is captured by writing capture system 108 and communicated to controller 106, which determines the digital information corresponding to the writing. The digital information may be then communicated to a projector for projection on to surface 102.

A user of IWB system 100 may use different writing instruments to "write" or provide input. In one embodiment, the writing instrument may be a physical object that may or may not leave a visible mark on surface 102. For example, a user may use his finger as a writing instrument to write on surface 102. Even though the finger may not leave any visible mark on surface 102, the finger's movements are captured and then translated to digital information, which may be then projected on surface 102. As another example, the user may use a pointer or a stylus as a writing instrument to write on surface 102, where the stylus may not leave any physical visible mark on surface 102. In other embodiments, a user may also use a writing instrument that leaves a visible mark on surface 102. For example, a user may use a pen or a regular dry erase marker to write on surface 102. The user's writings are captured, digital information corresponding to the writings determined, and the digital information then projected on surface 102.

In one set of embodiments, in addition to writing, a writing instrument 152 may also be used to interact in other ways with IWB system 100. For example, in one embodiment, writing instrument 152 may be used to erase previously written information.

Surface 102 may be a passive or active surface. In one embodiment, surface 102 may be a passive surface that simply accepts marks from a pen than can be identified by an external sensor like a camera. For example, display surface 102 may be a plain old opaque whiteboard. In another embodiment, surface 102 may be an active surface like a surface containing a sensor, for example from Wacom Co., Ltd in Japan. Such sensors contain an antenna and interact with radio frequency identification (RFID) pens containing a passive coil. By activating the antenna in a specific way, the pen can be triggered and the antenna can measure the pen's response to the antenna and identify the pen's location and orientation. Other active surfaces include resistive touch systems which measure a change in resistance to identify the location of an object pressing against the screen. Other examples of active surfaces include glass boards surrounded with infrared LEDs which use "frustrated total internal reflection" (FTIR) to allow a camera to capture the location of a finger or pen on the surface or a capacitive touch screen like those found on iPad and iPhone devices from Apple, Inc. in Cupertino, Calif.

Writing capture system 108 is configured to capture the writings made by a user on surface 102. The writing information captured by writing capture system 108 may then be communicated to controller 106 for further processing. Writing capture system 108 may comprise one or more components that enable the writings on surface 102 to be captured. For example, in an embodiment a writing instrument that leaves a visible mark on surface 102 is used, writing capture system 108 may comprise a camera (not shown) that may be positioned in front of surface 102 and configured to capture images of surface 102, including the visible marks made on surface 102. The captured images may then be communicated to controller 106, which may be configured to process the images to determine digital information corresponding to the marks made on surface 102.

In another embodiment, writing capture system 108 may comprise one or more sensors that are configured to capture the motion or movement of the writing instrument when the user uses the writing instrument to write on surface 102. The motion may be captured using different techniques. According to one technique, motion sensors may be placed along surface 102 that are capable of capturing the motion of writing instrument in a 2-dimensional plane (or in three dimensions). The captured motion information may then be conveyed to controller 106, which may process the captured information to determine the user's writings and determine digital information corresponding to the writings. In other embodiments, writing capture system 108 may determine strokes information from the captured motion information.

For example, there may be one or more sensors embedded in or positioned on writing surface 102. The sensors may be able to determine when writing instrument 152 makes contact with surface 102 and when the contact is interrupted. In other words, the sensors can determine the start and end of each stroke. Each sensor may have specific location coordinates associated with it in a two-dimensional coordinate system. Thus the location of each sensor may be expressed as $$L=(x_i, y_i)$$

Where $x_i$ is the x-coordinate for the sensor and $y_i$ is the y-coordinate for the sensor. In some embodiments, a stroke may start at point A and end at point B on surface 102. Thus, based on the 2-dimensional coordinate system, the stroke may start at point $A=(x_1, y_1)$ and end at point $B=(x_2, y_2)$. The writing capture system may receive the coordinates of points A and B once the stroke is completed. In some embodiments, writing capturing system 108 may also capture one or more points $(x_i, y_i)$ between points A and B for providing better accuracy. Controller 106 may receive the information for all the captured points for a stroke and may then apply a curve fitting algorithm to fit a curve to the points. Once the curve-fitting operation is complete, the controller now has a digital representation of the stroke being written on surface 102. This digital representation or digital information can be used for further processing as disclosed in various embodiments disclosed below. It should be noted that calculations in a three-dimensional coordinate system will be different in order to generate the digital information.

In yet another embodiment, writing capture system 108 may comprise one or more pressure sensors that may be incorporated into surface 102 making surface 102 pressure sensitive. Such a pressure mapping multi-touch surface can be built from force sensitive resistor material sandwiched between a flexible electronic circuit like those available from TekScan, Inc. in South Boston, Mass. In such an embodiment, surface 102 may provide a multi-touch pressure sensing surface that can capture writing information based upon a user's touches on surface 102. The captured writing information may then be communicated to controller 106 for further processing. In other embodiments, writing capture system 108 may use the captured writing information to determine strokes information associated with the captured writing information. In one embodiment, in addition to sensing a user's writing, the pressure sensors may also be able to determine the force with which a mark is written on surface 102. This force information may also be communicated to controller 106 for further processing and analysis.

In yet another embodiment, surface 102 may be a capacitively-coupled input interface such as the surface found on an Apple iPad™ or iPhone™. In such an embodiment, surface 102 may enable a multi-touch input experience, zooming and panning capabilities, and the like. In such an embodiment, a user may use a finger or a conductive stylus to write on surface 102 and the writings may then be communicated to controller 106 for processing and analysis.

In one embodiment, writing instrument 152 used by the user to write on surface 102 may be communicatively linked with writing capture system 108 (or with some other component of IWB system 100). This link, which may be wired or wireless, enables writing capture system 108 to capture the writings made using the writing instrument.

In some embodiments, surface 102 may incorporate an image sensor 104, e.g., a camera and/or one or more audio sensors 112 such as microphones. Image data captured by image sensor 104 and audio data captured by audio sensors 112 may be sent to controller 106. In some embodiments, image sensor 104 captures an image of user 150 as the user is writing on surface 102. In other embodiments, image sensor 104 may capture a series of images of user 150 as user 150 is writing on surface 102. Each of the captured images may have a time stamp associated with it indicating the date and time of the image capture. Audio sensors 112 may capture audio information continually and send the captured audio information to controller 106. The captured audio information may also have a time stamp associated with it.

Controller 106 acts a central component for processing that controls and enables the various functions provided by IWB system 100. Controller 106 may be operatively coupled to writing capture system 108, image sensor 104, and audio sensors 112. Controller 106 may be configured to receive writing information captured by writing capture system 108, image information from image sensor 104, and audio information from audio sensors 112. The writing information may be in various different formats such as pressure information, motion information, strokes information, and the like. Controller 106 may be configured to process the writing information and associate an image and/or audio with the writing information. Controller 106 may be configured to store the association information in database 110. Controller 106 may typically be a processor-based computing device such as computer system 1100 depicted in FIG. 11. Controller 106 may execute one or more programs (code instructions), which when executed by a processor of controller 106, enable the determination of digital information corresponding to the writings on surface 102 and generating association information associating strokes information with an image and/or a user. In some embodiments, controller 106 may not be part of IWB system 100. For example, controller 106 may be implemented in a user's personal computer.

In one embodiment, the writing information may comprise a time-ordered set of strokes. For example, in an embodiment where surface 102 is pressure-sensitive, a stroke may correspond to data produced by a writing instrument from the time the writing instrument first contacts surface 102 until the contact is interrupted. Accordingly, the writings made by a user may be represented by a series of strokes, each stroke having an associated time component indicative of when the stroke was made. As described above, a stroke may include one or more writing elements. In one embodiment, controller 106 may receive information corresponding to a set of captured strokes from writing capture system 108. In an alternative embodiment, controller 106 may receive information from writing capture system 108 and then process the captured information to determine strokes information. Controller 106 may then determine digital information corresponding to the strokes information. In one embodiment, the digital information determined by controller 106 reflects the writings made on surface 102. For example, if the user writes a "W" on surface 102 then the digital information determined by controller 106 is a "W". Controller 106 may then communicate the determined digital information to projector (not shown) for projection on surface 102.

In some embodiments, controller 106 receives the stroke information from writing capture system 108, image information from image sensor 104, and optionally audio information from audio sensors 112. Controller 106 compares the time stamps associated with each of the above items of information received. Based on the time stamps, the controller correlates the stroke information with the image information and optionally with the corresponding audio information. The correlation information may be then stored in database 110.

In some embodiments, each stroke captured by writing capture system 108 may be assigned a unique stroke identifier (stroke ID). The stroke ID can be numeric, alphanumeric, or any other suitable sequence of characters. Similarly, each image captured by image sensor 104 may also have an unique image ID associated with it. This may help to better track the images and the strokes as multiple users generate strokes in any given time period. In some embodiments, interactions with IWB system 100 can be grouped together by discrete time periods called "sessions." Each "session" has a finite duration. The specific time duration for a session may be (a) based on the type of session, e.g., a weekly status meeting vs. a 3-hr class room lecture, (b) predefined by a user, e.g., 1-hr meeting, or (c) can be determined dynamically by IWB system 100. For instance, if there is no interaction with IWB system 100 for 10 minutes following the last interaction, IWB system 100 may conclude that the current session has ended and automatically close the session. The term "interaction" as used herein can be a user writing on surface 102, a user coming into the field of view of image sensor 104, or audio sensors 112 capturing a user's voice. In some embodiments, the IWB system may include a "mode" switch that may be operated to indicate start and end of a session.

As described above, in an IWB system, a user's writings are converted into digital information, which may then be projected and displayed on a surface of the IWB system 100. Converting the "written" information to digital information enables several operations that can be performed on electronic information to be now performed on information written on a whiteboard. The true power of such a system is realized when an IWB system is used in a network environment. In a network environment, two or more IWB systems may internetworked via a communication network (such as the Internet) and used in a collaborative manner.

Further, while IWB system 100 has been described with reference to particular blocks as shown in FIG. 1, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatuses including electronic devices implemented using any combination of circuitry and software.

Figures 2A, 2B:
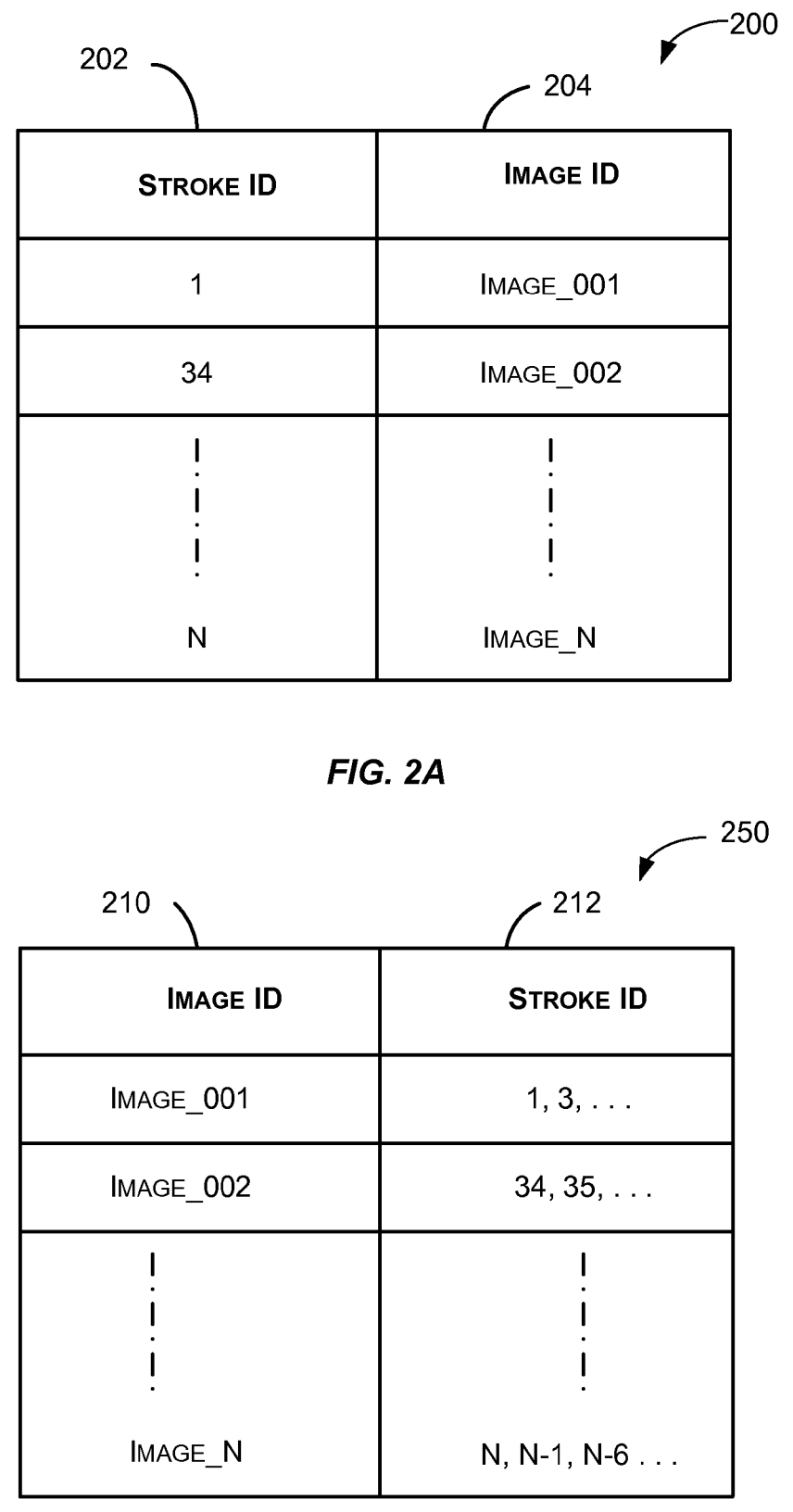

As described above, controller 106 analyzes the stroke (writing) information received from writing capture system 108 and image information received from image sensor 104 and generates correlation information between them. FIG. 2A illustrates a table 200 according to an embodiment of the present invention. Table 200 may be stored in, e.g., database 110 of FIG. 1. Table 200 may include a stroke ID section 202 and an image identifier (image ID) section 204. Stroke ID section 202 may include a listing of stroke identifiers associated with the stroke information received from, e.g., writing capture system 108 of FIG. 1. Image ID section 204 includes a listing image identifiers associated with user images captured by image sensor 104. Examples of image ID can include filename for the image file, serial number of the image, etc. Table 200 illustrates an embodiment where stroke ID 202 may be used for indexing all the associated images. In some embodiments, each stroke ID may be associated with an image corresponding to the stroke ID as determined by the time stamp information associated with them. In some embodiments, a single stroke ID may be associated with multiple image ID's. It is to be understood that table 200 is shown for illustrative purposes only. Table 200 may include more or less information than what is illustrated in FIG. 2A.

Table 250 illustrated in FIG. 2B is an alternative method for storing correlation information between strokes information and an image according to an embodiment of the present invention. In table 250, image ID 210 may be used to index the correlation information. Stroke ID 212 includes a listing of stroke identifiers associated with strokes information captured by the writing capture system. As illustrated in table 250, a single image ID may be associated with multiple stroke ID's. In some embodiments, a single image may be associated with multiple strokes, e.g., a user writing multiple words/sentences. It is to be understood, that table 250 is shown for illustrative purposes only. Table 250 may include more or less information than what is illustrated in FIG. 2B.

Figure 3:
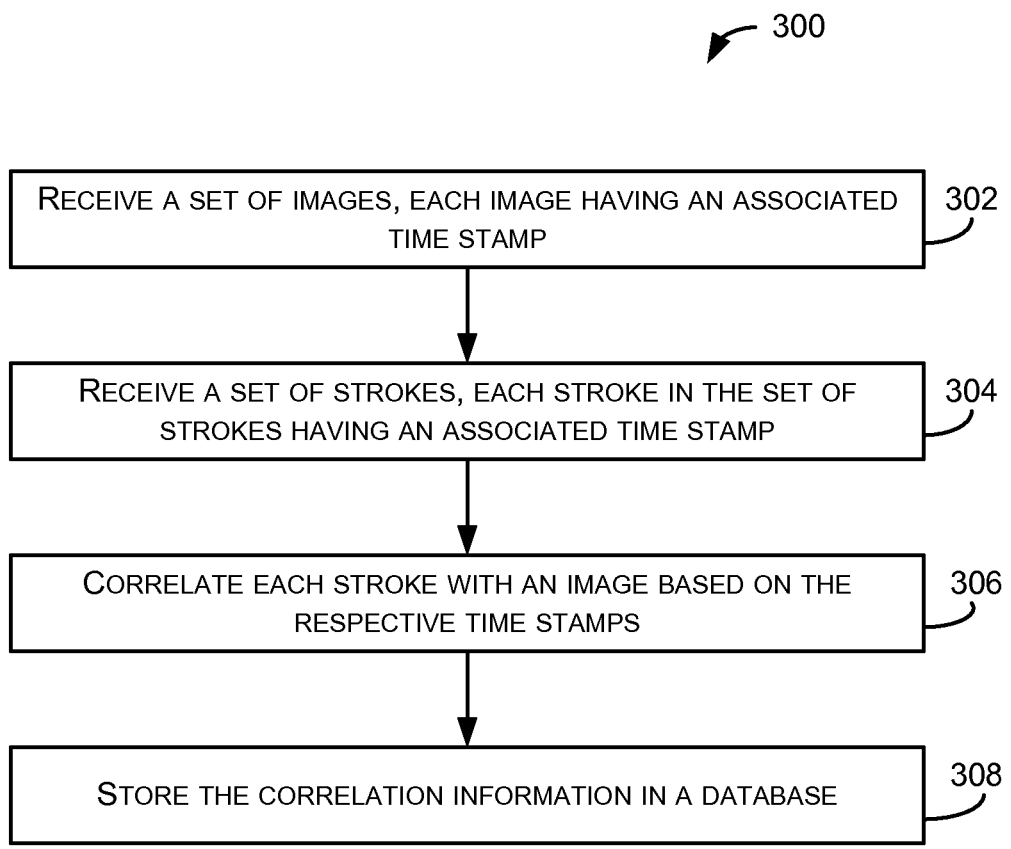
FIG. 3 depicts a simplified flowchart depicting processing performed by a IWB system according to an embodiment of the present invention.

As described above, the IWB system may provide the ability to store stroke information in association with an image. FIG. 3 is a flow diagram of a process 300 for associating an image to a stroke according to an embodiment of the present invention. Process 300 may be performed, e.g., by controller 106 of FIG. 1. The processing may be performed using software (e.g., code, instructions, program) executed by a processor of the controller, hardware of the controller, or combinations thereof. In one embodiment, the software executed by a controller may be stored on a non-transitory computer-readable storage medium.

The controller receives a set of images from the image sensor associated with the IWB system (302). The set of images may include one or more images. Each captured image has a time stamp associated with it and may show the face of a user. The time stamp provides temporal information as to the day and time of the image capture. In some embodiments, the controller may control the image sensor to capture the set of images. The controller also receives a set of strokes from the writing capture system (304). Each stroke in the set of strokes also has an associated time stamp indicating the day and time the stroke was generated. As described above, in some embodiments, a stroke may include multiple writing elements. In this instance, the controller receives information about the one or more writing elements associated with a stroke along with the time stamp for each writing element. In this instance, where a stroke includes multiple writing elements, the time stamp for the stroke includes the combined duration of all the writing elements that constitute the stroke. After the controller receives the set of images and the set of strokes, the controller analyzes the time stamp information associated with set of images and the set of strokes to determine correlation information between an image from the set of images and a stroke from the set of strokes (306). For example, if the controller determines that a stroke and an image have time stamp values that are within a margin of error defined for the operation, the controller may conclude that the image was taken concurrent to the stroke being generated and that the person shown in the image generated that stroke. Based on this determination, the controller may generate correlation information correlating the stroke ID of the stroke with the image ID of the image. Once the correlation information in generated, the controller may store the correlation information in a database associated with the IWB system (308).

It will be appreciated that process 300 described herein is illustrative and that variations and modifications are possible. Acts described as sequential can be executed in parallel, order of acts can be varied, and acts can be modified or combined. For instance, in some embodiments, the controller may also receive audio input from audio sensors 112. In this instance, the controller may also correlate the received audio input with the set of strokes, e.g., using the time stamp matching process described above.

FIG. 4 illustrates a table 400 illustrating an additional method for storing correlation information according to an embodiment of the present invention. Table 400 includes a image ID section 402, a stroke ID section 404 and a additional information section 406. Image ID section 402 includes a listing of one or more image ID's for the images captured by the image sensor. Stroke ID section 404 includes one or more stroke ID's associated with the one or more strokes captured by the writing capture system. The correlation between the one or more strokes and the one or more images may be determined as described above in relation with FIG. 3. However in the embodiment described above, identity of the user may not be known since only the image of the user is correlated with the stroke. In some embodiments, it may be necessary to determine the identity of the user in the image. In this instance, the image of the user may be used to search a database to determine additional information about the user. For example, the controller may search the database and use conventional image/face recognition techniques to determine the identity of the user in the captured image by comparing the captured image with images stored in the database. Once a match is found, the controller may obtain additional information about the user and populate section 406 of table 400. In some embodiments, additional information 406 may include name, contact information, and/or location of the user. Of course, one skilled in the art will realize that table 400 may include other information in addition to or in lieu of the information illustrated in FIG. 4. In some embodiments, the additional information may be used later to send information to the identified user after end of the current session.

As described above, in one embodiment, interactions with the IWB system may be grouped based on a session. For example, the IWB system may group strokes and images by a session. Thus, a session may include multiple strokes and images. FIG. 5 illustrates a table 500 for storing correlation information according to another embodiment of the present invention. Table 500 includes a session ID section 502, a stroke ID section 504, and an image ID section 506. Session ID section 502 includes identifiers for one or more sessions associated with the IWB system. As described above, a session represents a finite time period in which one or more users may interact with the IWB system. Thus, multiple strokes may be generated by multiple users in a single session. For example, a session may represent a meeting having a 1-hr duration. Thus, grouping the stroke and user information by the session ID helps a user to understand information captured in the meeting. Additionally, if the meeting is a recurring meeting, the session ID's of all the related meetings can be linked to get a comprehensive overview of information disseminated in those meetings. Stroke ID section 504 includes identifiers for one or more strokes associated with each session ID. Image ID section 506 includes identifiers for one or more images associated with each session ID. Thus, table 500 provides an additional method for storing the stroke information. Of course, one skilled in the art will realize that table 500 may include other information in addition to or in lieu of the information illustrated in FIG. 5.

Figure 6:
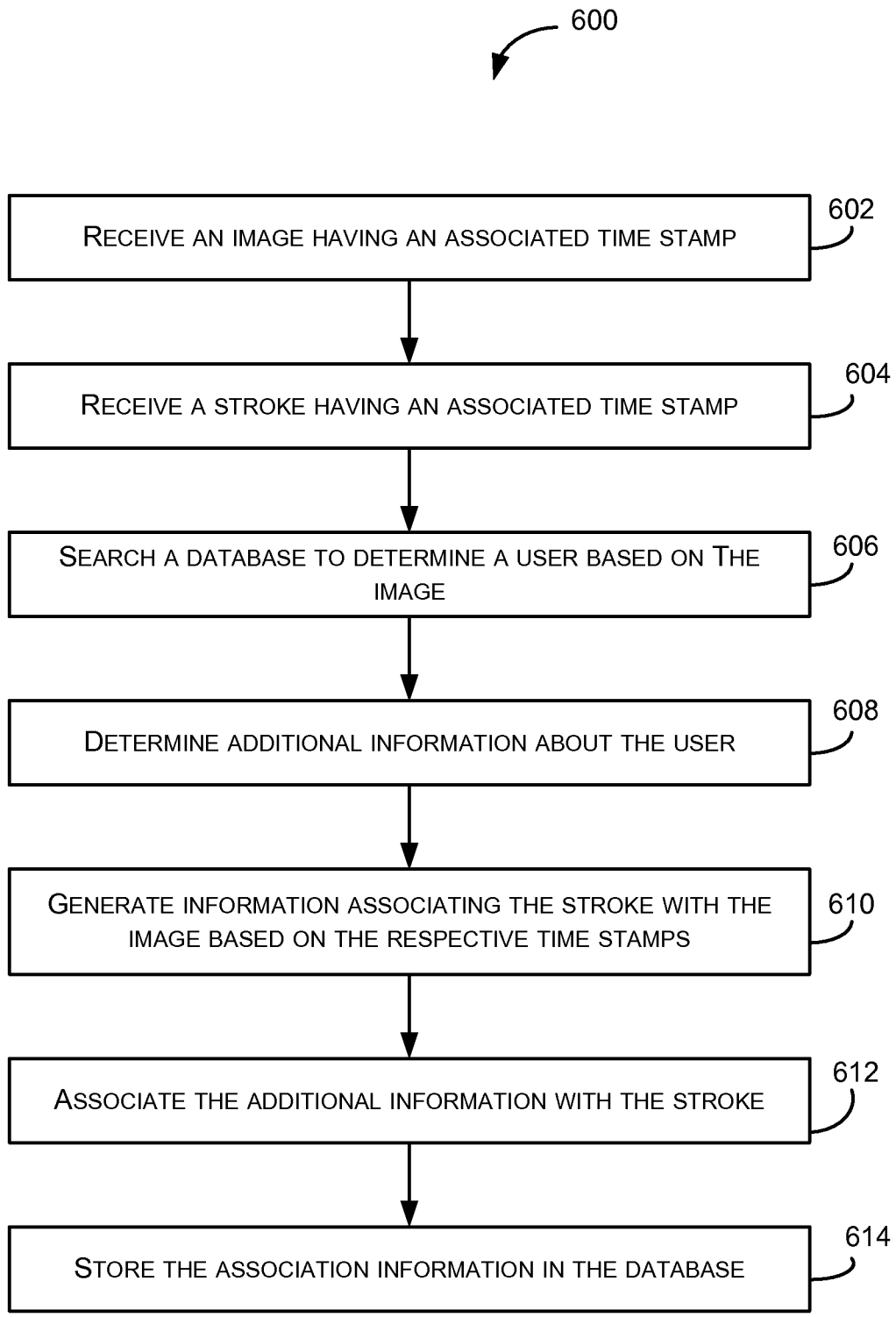
FIG. 6 depicts a simplified flowchart depicting processing performed by a IWB system for generating correlation information according to another embodiment of the present invention.

The choice of storing information in any one of the formats illustrated in FIGS. 2A, 2B, 4, and 5 may depend on type of information generated using the IWB system, the purpose for gathering the aforementioned information, and/or may be defined by the users of the IWB system. As discussed above, in some embodiments, it may not be enough to store the correlation information between a stroke and an image. FIG. 6 is a flow diagram for a process 600 for generating association information according to another embodiment of the present invention. Process 600 may be performed, e.g., by controller 106 of FIG. 1. The processing may be performed using software (e.g., code, instructions, program) executed by a processor of the controller, hardware of the controller, operating system combinations thereof. In one embodiment, the software executed by the controller may be stored on a non-transitory computer-readable storage medium. The steps depicted in FIG. 6 or the particular series of processing steps depicted in FIG. 6 are not intended to limit the scope of embodiments of the present invention. Other or different processing steps may be performed in alternative embodiments. The processing in process 600 may be performed using software (e.g., code, instructions, program) executed by a processor of the controller, hardware of the controller, or combinations thereof. In one embodiment, the software executed by a controller may be stored on a non-transitory computer-readable storage medium.

In this embodiment, the controller receives an image showing the face of the user and having an associated time stamp (step 602). The controller also receives stroke information having an associated time stamp (step 604). The controller searches a database to determine the identity of the user based on the received image (step 606), e.g., using a face recognition algorithm. If the controller is able to identify an image stored in the database that matches the information in the received image, the controller obtains additional information about the identified user (step 608). The additional information may be stored in the database and may include name, contact information, location, etc of the identifier user. The controller then generates association information correlating the received stroke information and the received image, e.g., as described above in relation to FIG. 3 (step 610). Thereafter, the controller may also associate the additional information for the identified users with the stroke and the image (step 612). The association information may be then stored in a database (step 614), e.g., table 400 of FIG. 4.

In some instances, an image of the user may not provide enough information to identify the user beyond a doubt and hence additional verification may be needed to confirm the results of the image/face matching, or the image/face matching process may yield more than one potential match for the user in the image. In such instances, it would be advantageous to have an additional method for determining the actual user who generated a particular stroke or set of strokes. In other embodiments, more than one user may concurrently write on the writing surface. In this scenario, the image capture device may capture an image that includes two users and further analysis may be needed to determine which stroke is to be attributed to which user.

Figure 7:
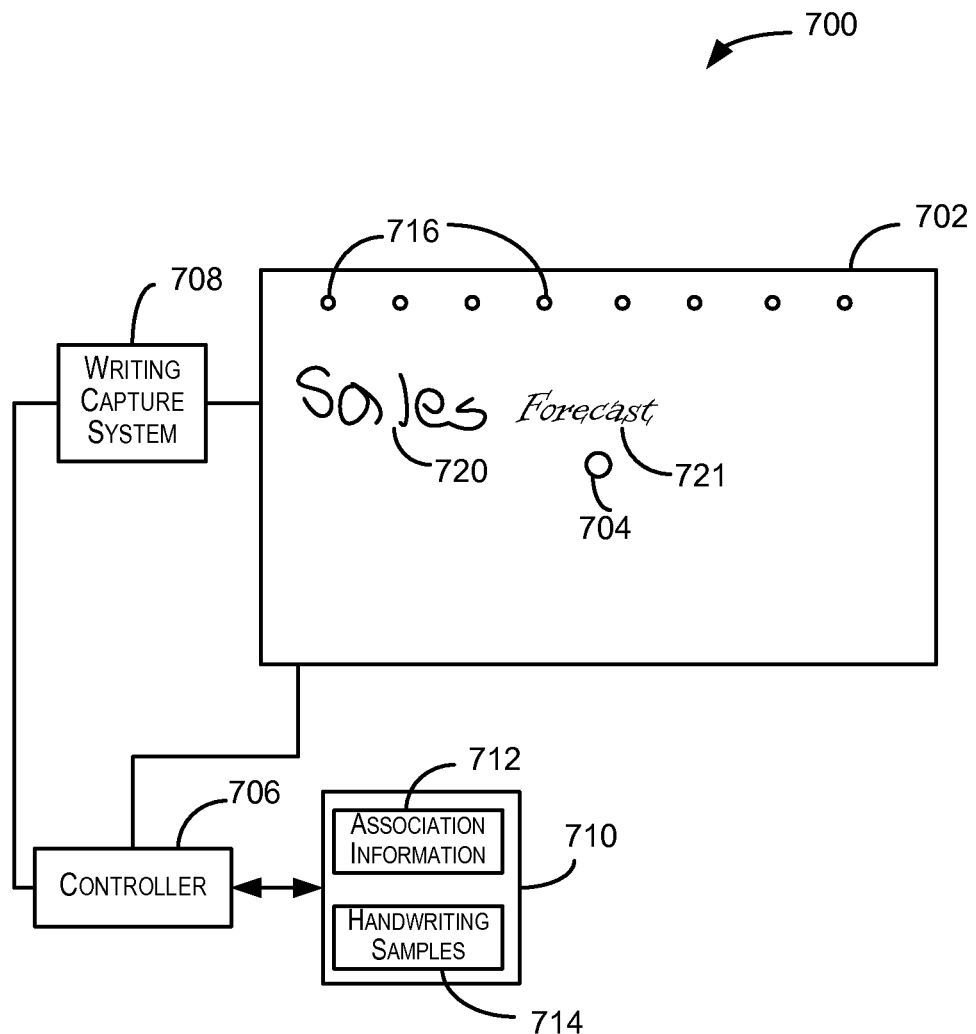
FIG. 7 is a simplified block diagram of an Interactive Whiteboard (IWB) system according to another embodiment of the present invention.

FIG. 7 illustrates IWB system 700 according to another embodiment of the present invention. IWB system 700 includes surface 702, writing capture system 708, controller 706 and database 710. Surface 702, writing capture system 708, controller 706 are similar to corresponding elements described in reference to FIG. 1, hence explanations of these elements is not repeated here for brevity.

In some embodiments, database 710 may include one or more handwriting samples 714 of one or more users that may use IWB system 700. Database 710 may also include association information 712 between a user and associated stroke(s) generated by the user. FIG. 7 illustrates text 720 and 721 on surface 702. Suppose that text 720 is written by user A and text 721 is written by a user B at time different from when user A wrote text 720. Image capture device 704 may capture an image A of user A and an image B of user B. Optionally, audio sensors 716 may also capture the sound of both users.

In some embodiments, controller 706 may receive the image A and search database 710 to find a match for image A. However, controller 706 may not find an exact match and instead controller 706 may determine that there are three potential matches for image A. In this instance, controller 706 may retrieve the handwriting samples, e.g., from a database of handwriting samples 714, for the three potential matches and compare text 720 with the retrieved handwriting samples. The handwriting analysis can be performed using any known techniques for handwriting analysis. Based on the handwriting analysis, the controller may determine that one of the three handwriting samples matches (within the defined error parameters) text 720. If so, controller 706 may identify the user associated with the handwriting sample and generate association information between the stroke, image A, and the identified user. A similar process may be performed using text 721 to attribute text 721 to user B.

Figure 8:
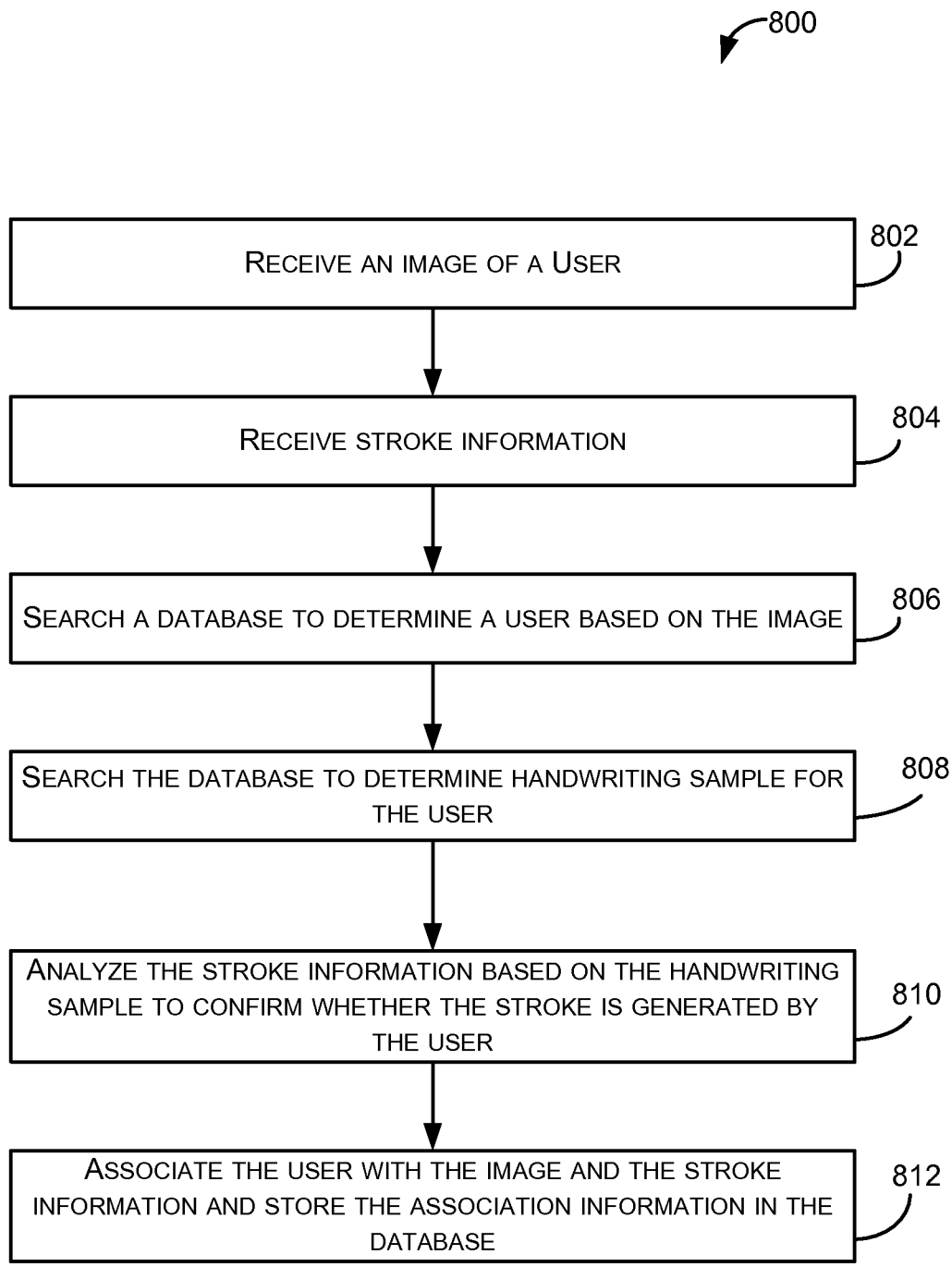
FIG. 8 depicts a simplified flowchart depicting processing performed by a IWB system according to another embodiment of the present invention.

FIG. 8 is a flow diagram of a process 800 for associating a user with stroke information according to another embodiment of the present invention. Process 800 may be performed by, e.g., controller 706 of FIG. 7. The processing may be performed using software (e.g., code, instructions, program) executed by a processor of the controller, hardware of the controller, operating system combinations thereof. In one embodiment, the software executed by the controller may be stored on a non-transitory computer-readable storage medium. The steps depicted in FIG. 8 or the particular series of processing steps depicted in FIG. 8 are not intended to limit the scope of embodiments of the present invention. Other or different processing steps may be performed in alternative embodiments.

The controller receives an image of a user (step 802) and strokes information (step 804). The controller searches a database to determine the identity of the user (step 806) by matching user attributes, e.g., face, in the image to one or more images stored in the database. Once the controller identifies the user in the image, the controller searches the database to retrieve a handwriting sample for the identified user (step 808). The controller then compares the handwriting sample with the received stroke information to confirm whether the user identified in step 806 is indeed the user who generated the strokes information (step 810). Once it is confirmed, based on the handwriting analysis, that the stroke information is generated by the identified user, the controller generates correlation information associating the stroke information with the received image, and optionally with identifying information for the user in the image (step 812).

Figure 9:
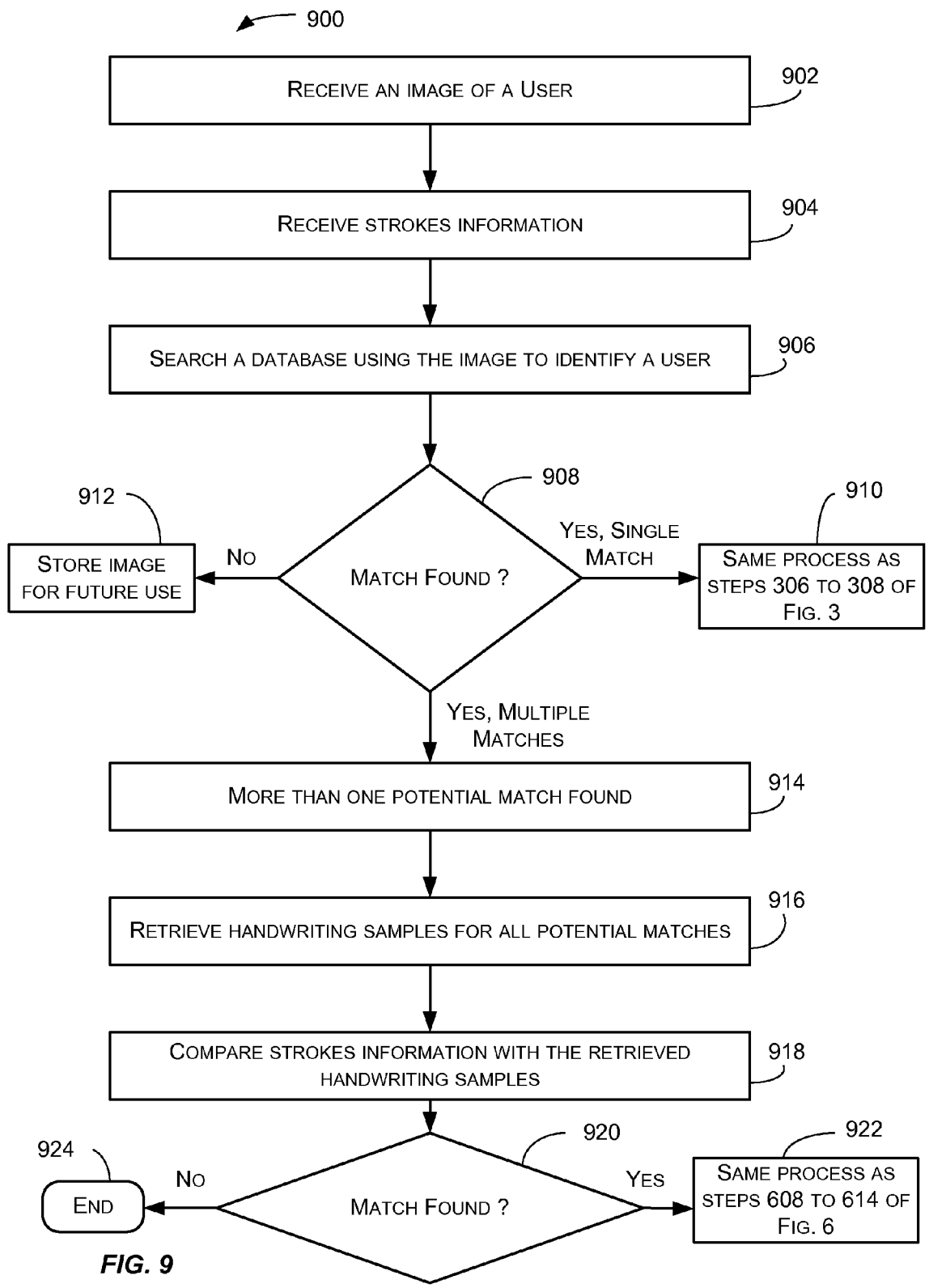
FIG. 9 depicts a simplified flowchart depicting processing performed by a IWB system according to yet another embodiment of the present invention.

FIG. 9 is a flow diagram of a process 900 according to yet another embodiment of the present invention. Process 900 may be performed by a controller of the IWB system. The processing may be performed using software (e.g., code, instructions, program) executed by a processor of the controller, hardware of the controller, operating system combinations thereof. In one embodiment, the software executed by the controller may be stored on a non-transitory computer-readable storage medium. The steps depicted in FIG. 9 or the particular series of processing steps depicted in FIG. 9 are not intended to limit the scope of embodiments of the present invention. Other or different processing steps may be performed in alternative embodiments.

As shown in FIG. 9, the controller may receive an image of a user captured by the image sensor of the IWB system (step 902). In some embodiments, the image may include face of the user who was writing on the writing surface at the time the picture was taken. The controller may also receive stroke information captured by a writing capture system of the IWB system (step 904), e.g., strokes information. As previously described, the strokes information may comprise a series of time-ordered strokes that represent the information written by a user of the IWB system. The controller may then search a database to determine the identity of the user in the image by comparing one or more attributes of the user displayed in the image to the stored information about one or more users in the database (step 906). The controller may then determine if an acceptable match was found for the received image in the database (step 908). If an acceptable match is found, the controller can perform similar processing as described in relation to steps 306 and 308 of FIG. 3 (step 910). If no match is found for the received image, the controller may store the received image in the database for future use (step 912). If the controller determines that there are more than one potential match for the received image (step 914), the controller may identify all the potential matches and retrieve handwriting samples for all the potential matches (step 916).

Thereafter, the controller may analyze the received stroke information based on the retrieved handwriting samples to determine whether one of the retrieved handwriting samples matches the strokes information (step 918). If the controller is unable to determine an acceptable match (920), the process ends (step 924) and controller may generate a message indicating no user can be located for the received image and strokes information. If the controller determines that one of the handwriting samples matches the strokes information, the controller may generate correlation information associating the image, the strokes information and information about the identified user (step 922) similar to the process described in relation with steps 608-614 of FIG. 6 above.

Figure 10:
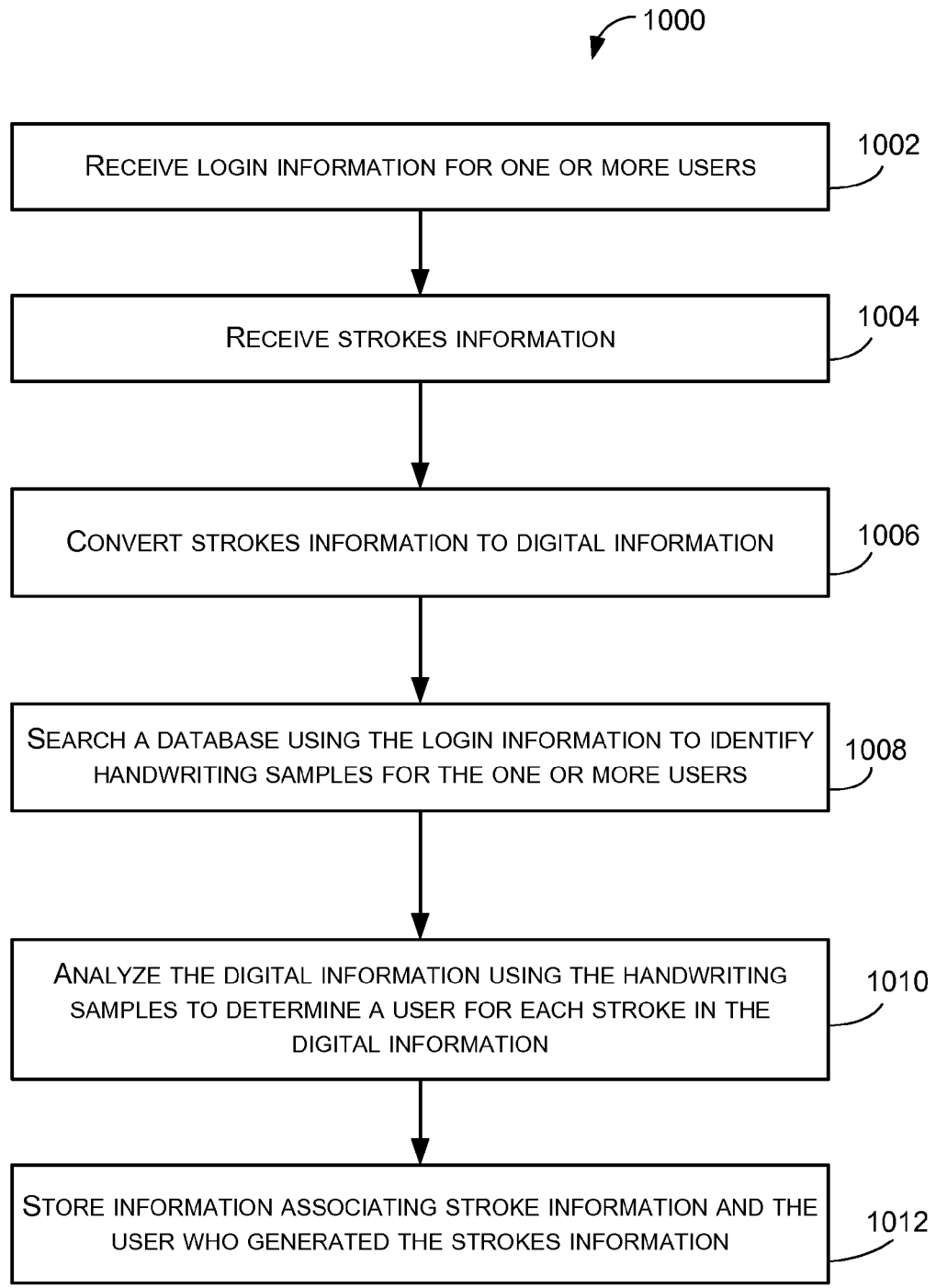
FIG. 10 depicts a simplified flowchart depicting processing performed by a IWB system according to yet another embodiment of the present invention.

In some instances, where the IWB system may not be configured to capture images or may be unable to capture images, the IWB system can still associate the strokes information with the user who generated the strokes information. FIG. 10 is a flow chart of a process 1000 for associating strokes information with a user according to still another embodiment of the present invention. The process in FIG. 10 assumes that the IWB cannot capture user images. The processing may be performed using software (e.g., code, instructions, program) executed by a processor of the controller, hardware of the controller, operating system combinations thereof.

In one embodiment, the software executed by the controller may be stored on a non-transitory computer-readable storage medium. The steps depicted in FIG. 10 or the particular series of processing steps depicted in FIG. 10 are not intended to limit the scope of embodiments of the present invention. Other or different processing steps may be performed in alternative embodiments.

The process in FIG. 10 may be performed by a controller of the IWB system described above. As shown in FIG. 10, the controller may receive login information of the users who are currently using the IWB system (step 1002). Each user who intends to use the IWB system may login with his/her unique credentials before they use the IWB system. The IWB system can search a database to get additional information for the logged in users, if needed. The controller may then receive the strokes information as each user writes on the writing surface (1004). The controller may convert the strokes information to digital information, e.g., by employing a curve fitting technique. (1006). The digital information may represent a digital version of the handwriting for each user. The controller may then retrieve handwriting samples for each of the logged in users (step 1008) and compare the generated digital information with the handwriting samples to detect a match for each stroke or a set of strokes in the digital information (step 1010). Once a match is detected, the controller may generate correlation information associating the user with the strokes information and storing that information in a database (step 1012).

In some embodiments, the controller may capture the strokes information for an entire session prior to performing the handwriting analysis. In this instance, at the end of the session, the controller may convert the received strokes information to digital information and compare that to the one or more handwriting samples of the logged in users. Then depending on the match found, portions of the strokes information may be attributed to the appropriate user and association information between the strokes information and the user may be stored in a database.

In some embodiments, it may be possible to estimate which image is to be associated with which strokes information based on the position of the image sensor and position information about the strokes in the 2-D coordinates. For example, if user 1 is writing in the north-west corner of the writing surface and user 2 is writing in the south east corner of the writing surface, the IWB system may assign the image sensor closest to the respective locations to track users 1 and 2. Thus, when the image data and the strokes information is received by the controller, the controller can determine the location of the image sensor (it may already be predefined) and location information (e.g., x-y coordinates) of the strokes information to make the correlation between the received image and received strokes information. In some embodiments, the method need not use the time stamp information at all. In other embodiments, time stamp information may be used in addition to the position information to further refine the correlation.

In some embodiments, where multiple IWB systems are being used in a collaborative environment, each IWB system may perform the correlation operation locally and upload the results to a central server. Any authorized user may access the server and download the association information on their local computer systems. In this manner, none of the users have to rely on other mechanisms to determine who contributed certain information during a session. In some embodiments, the IWB system may not perform the correlation operation. Instead, the IWB system may provide raw image and strokes data to a user's computer system, which may then perform the analysis and generate the correlation information. In this embodiment, the database may either be resident on the user's computer system or on a central server that the user can access using his computer system. In this manner, the computationally intensive task can be performed on each user's computer system thereby avoiding slowing down the IWB system. In other embodiments, only the handwriting analysis may be performed on the user's computer system since that may be the most processor intensive task.

In some embodiments, the image sensor of the IWB system may also capture images of persons not actively writing on the writing surface but who may be part of the session, e.g., a meeting, in which the IWB system is being used. In this embodiment, after the controller receives the captured images, the controller may search a database to determine the identity of the persons in the images and retrieve contact information for the identified persons, e.g., an e-mail address. After the end of the session, the controller may convert the strokes information captured by the writing capture system and convert that into digital information using, e.g., the curve fitting technique. Thereafter the controller may send, e.g., e-mail, the digital information to all the participants that were identified as being part of that session. In some embodiments, the controller may send the digital information in a default format specified during the configuration of the IWB system. In other embodiments, each user/participant may specify a preferred format, e.g., MS Word, PDF, PowerPoint, etc. in his/her profile. In this embodiment, after the controller identifies the participants based on the images as described above, the controller may also query the profile for each identified participant to determine their preferred format. Based on that, the controller may format the digital information according to the specified format for each user and send the digital information in that format to the user.

Although the above embodiments have been described as using a face recognition algorithm to determine the identity of the user in the received image. This need not be the case. In some embodiments, the image sensor may continuously track a user as he/she writes on the writing surface. The image sensor may not only capture the face of the user but in addition may capture the clothing, gestures, gait, and other biometric characteristics of the user such as height, eye color, fingerprints, etc. Some or all this information may be used by the controller to identify the user in the captured image.

In some embodiments, an additional image sensor may be positioned in front of writing surface such that its field of view encompasses the entire writing surface. In this embodiment, the image sensor captures a series of snapshots, with time stamps, of the writing surface and/or continuously monitors the writing surface during a session. This information may be sent to the controller in addition to the user image information captured by the embedded image sensor. The controller may then match the timestamps of the images from the two image sensors and associate stroke information on the writing surface with an user image received from the embedded image sensor.

Figure 11:
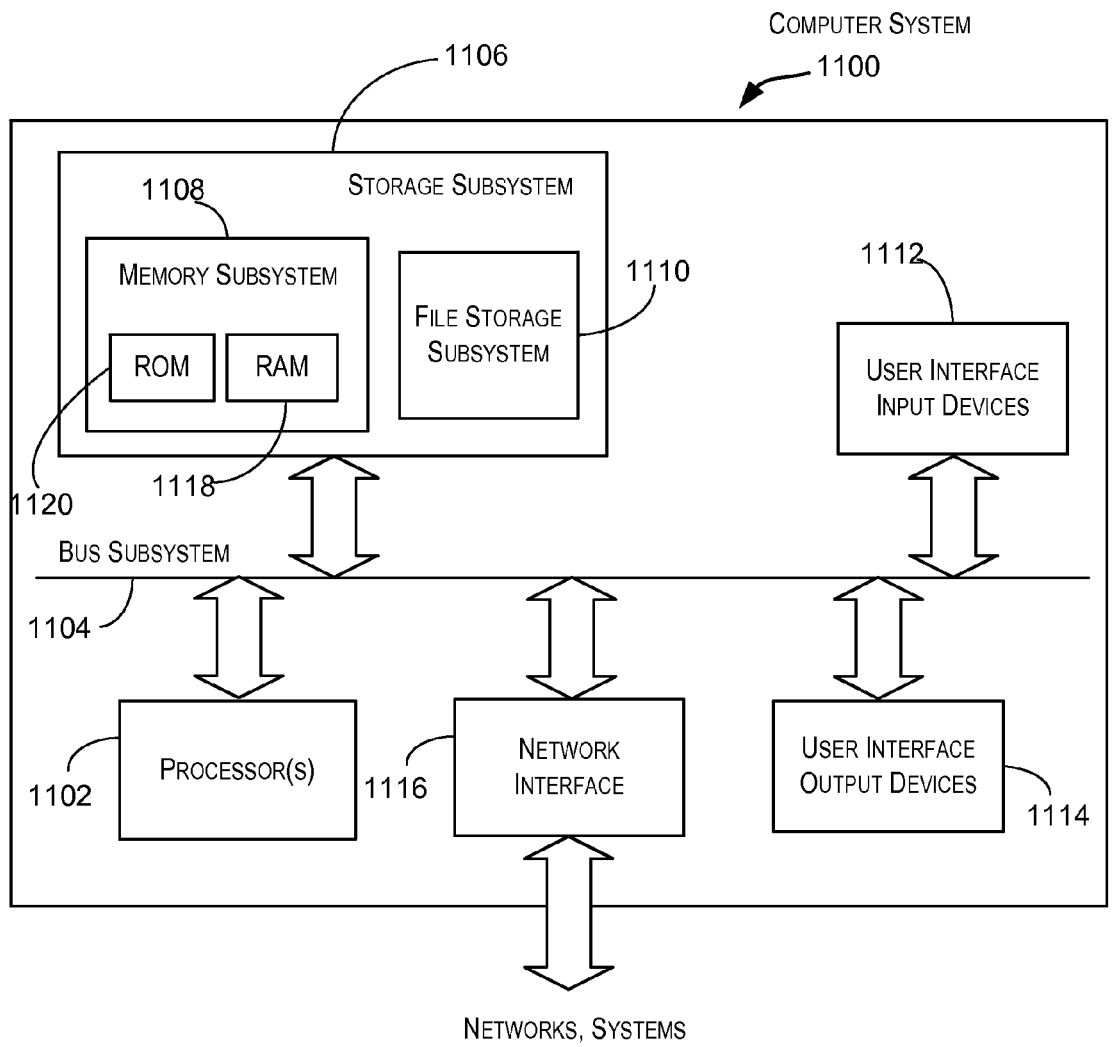
FIG. 11 is a simplified block diagram of a computer system that may be used to practice an embodiment of the present invention.

FIG. 11 is a simplified block diagram of a computer system 1100 that may be used to practice an embodiment of the present invention. In various embodiments, computer system 1100 may be used to implement any of the systems illustrated in FIG. 1 and described above. For example, computer system 1100 may be used to implement IWB system 100, controller 106, writing capture system 108, or database 110. As shown in FIG. 11, computer system 1100 includes a processor 1102 that communicates with a number of peripheral subsystems via a bus subsystem 1104. These peripheral subsystems may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for enabling the various components and subsystems of computer system 1100 to communicate with each other as intended. Although bus subsystem 1104 is shown schematically as a single bus, alternative embodiments of the bus subsystem may utilize multiple busses.

Network interface subsystem 1116 provides an interface to other computer systems and networks. Network interface subsystem 1116 serves as an interface for receiving data from and transmitting data to other systems from computer system 1100. For example, network interface subsystem 1116 may enable a user computer to connect to the Internet and facilitate communications using the Internet.

User interface input devices 1112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1100.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Storage subsystem 1106 provides a computer-readable storage medium for storing the basic programming and data constructs that provide the functionality of the present invention. Software (programs, code modules, instructions) that when executed by a processor provide the functionality of the present invention may be stored in storage subsystem 1106. These software modules or instructions may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 1100 can be of various types including a personal computer, a portable computer, a workstation, a network computer, a mainframe, a kiosk, a server or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, but this is not intended to limit the scope of inventive embodiments.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

What is claimed is:

1. A method comprising;
   receiving, by a system, a user identifier corresponding to a user, the user identifier having an associated first timing information;
   receiving, by the system, information about a stroke generated on a whiteboard, the stroke having an associated second timing information generated independently of the first timing information;
   determining, by the system, whether a correlation exist between the user identifier and the stroke based on comparing the first timing information and the second timing information;
   generating, by the system, information associating the user identifier with the stroke based at least in part on the comparison; and
   storing, by the system, the association information.

2. The method of claim 1 wherein the comparing comprises determining whether a value of the first timing information matches a value of the second timing information within a specified range.

3. The method of claim 1 wherein the user identifier comprises an image.

4. The method of claim 3 wherein the image is a still image and includes a face of the user.

5. The method of claim 3 wherein the image comprises a video.

6. The method of claim 1 further comprising receiving, by the system, audio information having a third timing information and comparing the third timing information with the first and the second timing information to determine correlation between the audio information and the stroke and the user identifier.

7. A method comprising:
receiving, by a system, strokes information about a set of strokes, the strokes information including first timing information indicating when the set of strokes were generated;
receiving, by the system, a user identifier with associated second timing information generated independently of the first timing information;
determining, by the system, that a user associated with the user identifier generated the set of strokes by comparing the first timing information with the second timing information;
determining, by the system, identity of the user based at least in part on the user identifier;
generating, by the system, digital information using the strokes information;
selecting, by the system, a handwriting sample for the user; and
using, by the system, the handwriting sample to analyze the digital information.

8. The method of claim 7 wherein generating digital information comprises applying, by the system, a curve fitting technique to the strokes information.

9. The method of claim 7 further comprising determining, by the system, whether the user generated the set of strokes based at least in part on the handwriting analysis.

10. The method of claim 7 wherein the user identifier comprises an image of the user.

11. The method of claim 10 wherein determining identity of the user comprises determining, by the system, one or more attributes of the user from the image and comparing the one or more attributes to the information stored in a database to determine a match, wherein the one or more attributes comprise a face, height, gait, gestures, or biometric information of the user.

12. The method of claim 7 further comprising determining, by the system, additional information about the user based at least in part on the user identifier.

13. The method of claim 12 wherein the additional information comprises name of the user, contact information of the user, or location of the user.

14. The method of claim 7 further comprising:
receiving, by the system, audio data with an associated third timing information; and
generating, by the system, association information between the audio data and the set of strokes based at least in part on the third timing information and the first timing information.

15. A system comprising:
a surface configured to accept user input;
an imaging device coupled to the surface and configured to capture images of users using the surface; and
a controller coupled to the surface and the imaging device, wherein the controller is configured to:
receive information about a stroke generated on the surface, the stroke having an associated first timing information generated in response to the surface accepting the stoke;
receive an image of a user from the imaging device, the image having an associated second timing information generated in response to the imaging device capturing the image of the user;
compare the first timing information and the second timing information;
generate correlation information between the stroke and the image of the user based at least in part on the comparison; and
store the correlation information.

16. The system of claim 15 wherein the image includes a representation of the user's face.

17. The system of claim 15 wherein the controller is further configured to:
receive audio information having a third timing information; and
compare the third timing information with the first and the second timing information to determine correlation between the audio information, the stroke, and the image.

18. The system of claim 17 wherein the audio information is captured using one or more microphones coupled to the surface.

19. The system of claim 15 wherein the controller is further configured to determine additional information for the user based on the image.

20. The system of claim 19 wherein the additional information includes one or more of: name, contact information, or location of the user.

* * * * *